US012729074B2

(12) United States Patent
Pohjolainen et al.

(10) Patent No.: US 12,729,074 B2
(45) Date of Patent: Sep. 8, 2026

(54) OVERHEAD LOADING AND UNLOADING SYSTEM, AND METHOD

(71) Applicant: RAUMASTER PAPER OY, Rauma (FI)

(72) Inventors: Jarmo Pohjolainen, Rauma (FI); Kaarlo Talvinen, Rauma (FI)

(73) Assignee: RAUMASTER PAPER OY, Rauma (FI)

( * ) Notice: Subject to any disclaimer, the term of this patent is extended or adjusted under 35 U.S.C. 154(b) by 0 days.

(21) Appl. No.: 19/091,901

(22) Filed: Mar. 27, 2025

(65) Prior Publication Data

US 2025/0313418 A1 Oct. 9, 2025

(30) Foreign Application Priority Data

Apr. 3, 2024 (FI) ..................................... 20245393

(51) Int. Cl.
*B65G 47/91* (2006.01)
*B65G 57/00* (2006.01)
*B65G 59/02* (2006.01)
*B65G 60/00* (2006.01)

(52) U.S. Cl.
CPC ......... *B65G 47/914* (2013.01); *B65G 57/005* (2013.01); *B65G 59/026* (2013.01); *B65G 60/00* (2013.01)

(58) Field of Classification Search
CPC .. B65G 47/914; B65G 57/005; B65G 59/026; B65G 60/00
See application file for complete search history.

(56) References Cited

U.S. PATENT DOCUMENTS 4,787,810 A * 11/1988 Cawley .............. B65H 31/3045 414/789.5
6,422,806 B1 * 7/2002 Jenkins ................ B65G 57/303 414/794.9
6,658,816 B1 * 12/2003 Parker .................. B65G 57/005 414/788.1
7,717,665 B2 * 5/2010 Jenkins ................ B65G 57/302 254/89 R
7,993,095 B2 * 8/2011 Reichler ................ B65G 57/24 414/789.5

(Continued)

FOREIGN PATENT DOCUMENTS

CN 106429427 B 7/2019
CN 114803557 A 7/2022

(Continued)

*Primary Examiner* — Lynn E Schwenning
(74) *Attorney, Agent, or Firm* — S.J. INTELLECTUAL PROPERTY LTD.

(57) ABSTRACT

An overhead loading and unloading system (1) and method for handling pallets (2). The system comprises a pickup station (3), a loading station (4), a storage station (5) for storing protective sheets (S), and an automatically controlled linear gantry robot (6). The gantry robot comprises a robot arm (12) provided with a gripper (13) comprising forks (23) for handling the pallets and a vacuum gripper (24) for handling the protective sheets. The robot arm transports the pallets on the forks from the pickup station to the loading station and stacks the pallets in several layers (L). The robot arm implements the vacuum gripper for placing the protective sheets between the stacked layers.

11 Claims, 4 Drawing Sheets

(56) References Cited

U.S. PATENT DOCUMENTS

| | | | | |
|---|---|---|---|---|
| 10,947,046 | B2 * | 3/2021 | Fellner ................. | B65G 1/1373 |
| 2013/0015675 | A1 * | 1/2013 | Pickard .................. | B65G 61/00<br>212/327 |
| 2018/0178994 | A1 | 6/2018 | Saylor | |

FOREIGN PATENT DOCUMENTS

| | | | |
|---|---|---|---|
| EP | 0377400 | A1 | 7/1990 |
| EP | 2072432 | A1 | 6/2009 |
| FR | 2814161 | B1 | 1/2003 |

* cited by examiner

OVERHEAD LOADING AND UNLOADING SYSTEM, AND METHOD

BACKGROUND OF THE INVENTION

The invention relates to an overhead loading and unloading system for handling pallets on which material is stacked.

The invention further relates to a method for handling pallets.

The field of the invention is defined more specifically in the preambles of the independent claims.

At production plants different materials are stacked on pallets for facilitating handling and transport of the produced materials. Different overhead industrial robots and robot systems have been developed for handling the pallets. However, the known solutions have shown to include some problems.

BRIEF DESCRIPTION OF THE INVENTION

An object of the invention is to provide a novel and improved overhead loading and unloading system and method for handling pallets.

The system according to the invention is characterized by the characterizing features of the independent apparatus claim.

The method according to the invention is characterized by the characterizing features and steps of the independent method claim.

An idea of the disclosed solution is that an overhead loading and unloading system intended for handling pallets on which material is stacked. An automatically controlled linear gantry robot is movable above a work area comprising a pickup station of the pallets, a loading station of the pallets and a storage station for storing protective sheets. The gantry robot comprises an overhead robot arm provided with a gripper. The gripper is provided with forks for handling the pallets and a vacuum gripper for handling the protective sheets. Then the robot arm transports the pallets on the forks of the gripper from the pickup station to the loading station. The robot arm can also stack the pallets in two or more layers one on top of the other. Further, the robot arm can pick up the protective sheets from the storage station by means of the vacuum gripper and can place the protective sheets on a first layer of the pallets prior stacking a second layer of the pallets on the first layer.

In other words, the solution implements multi-story loading of the pallets in at least two layers of pallets. The protective sheets are mounted between the layers. The handling of the pallets and the protective sheets are executed by an overhead gantry, which is an industrial robot with linear movement axis. Thus, in this solution the linear robot gantry or cartesian gantry is utilized.

An advantage of the disclosed solution is that the overhead robot arm can execute the pickup, loading, stacking and handling of protective sheets in a versatile and effective manner.

The overhead linear gantry robot is advantageous since it is capable to move the relatively heavy pallets with high precision and speed. Since the movements are done overhead, the working area is large, and operation is safe.

According to an embodiment, the system is configured to handle pallets on which flat sheet material is stacked. The sheet material on the pallets may be cardboard or paper material or may alternatively comprise pulp material.

According to an embodiment, the protective sheet handled by means of vacuum gripper of the system may be of paper based material, such as corrugated cardboard, cardboard, or other fiber material, such as plywood or chipboard.

According to an embodiment, movement range of the gantry robot defines a work cell below the gantry robot. Layout of the work cell may be arranged so that the loading station is located centrally, and the pickup station and the one or more storages stations are located on opposite sides of the loading station. Then transport distances of the gantry robot can be minimized and when the pickup station and the storage station are located on outer side portions of the work cell, it is easy to arrange transportation of the pallets and the protective sheets to the work cell.

According to an embodiment, the gripper is of a dual-type comprising the forks and the vacuum grippers. The forks and the vacuum grippers are selectively operable by turning the robot arm around vertical Z-axis. In other words, the robot arm can turn the gripper and thereby select which of the two handling elements is used. An advantage of the disclosed solution is that the selection of the handling element is easy and quick to execute by turning the gripper.

According to an embodiment, the forks and the vacuum gripper are mounted to a body of the gripper and are facing into opposite directions relative to each other.

According to an embodiment, the vacuum gripper is turnable between a horizontal operational position and a vertical home position in relation to turning axis by means of at least one actuator. In other words, the vacuum gripper has two selectable positions. An advantage of the disclosed solution is that when the vacuum gripper is not needed, it can be turned away into the home position. Then the gripper can be moved more freely without a risk that the vacuum gripper collides with the pallets.

According to an embodiment, the vacuum gripper comprises a frame with two turnable frame parts each provided with at least two suction elements.

According to an embodiment, width of the forks of the gripper are automatically adjustable in accordance with the pallets and under control of a control unit of the system. In other words, the forks can be widened and narrowed. It is also possible to move them simultaneously in lateral direction. An advantage of the disclosed embodiment is that the system is suitable for handling pallets in different size. There is no need to change the forks when handling different size of pallets which decreases costs and quickens the handling process.

According to an embodiment, the control unit is provided with sensing data on the pallets to be handled and the control unit provides control commands to adjust the fork width. The sensing data can be, for example, provided by means of one or more sensing devices, or cameras mounted to the gripper. Alternatively the sensing devices may be mounted to the pickup station, for example.

According to an embodiment, the control unit is provided with data on the pallets at the pickup station and the control unit generates control commands to adjust the fork width based on the received data. Thus, the pallets may be sensed or measured already at the pickup station, or even before delivery to the pickup station so that no separate measuring needs to be done by the gantry robot. The pallets may be provided with visual codes or electrically readable tags comprising identification data based on which the control unit is provided with data on the implemented pallets, weight of the loaded pallets, and other useful data.

According to an embodiment, the linear gantry robot comprises two overhead rails mounted on fixed vertical supports and a transverse bridge supported movably to the rails. A trolley is supported to the bridge and is movable in longitudinal direction of the bridge. The robot arm is mounted to the trolley. In other words, the gantry robot is supported on immovable pillars standing on the floor surface, or to wall or framework structure of a building. An advantage of the disclosed solution is that all the movable components of the gantry robot are mounted overhead whereby risks of collisions to personnel and to obstacles are avoided and overall safety is improved.

According to an alternative embodiment, the gantry robot is a gantry crane movable on rails arranged on a floor level.

According to an embodiment, the transverse bridge of the gantry robot has a lattice type structure. In other words, the bridge comprises one or more lattice beams comprising parallel longitudinal elements united by diagonal elements. An advantage of the disclosed solution is that the lattice type bridge may be light in weight and is still very rigid. The lattice bridge may have a long span due to its low weight and rigidity.

According to an embodiment, the bridge comprises at least two parallel support elements both having lattice structures.

According to an embodiment, the pickup station is a conveyor on which the pallets are transported from a production line to a cell comprising the disclosed overhead loading and unloading system. In other words, the conveyor is arranged to feed the pallets to the pallet handling cell below the gantry robot. An advantage of the disclosed solution is that the conveyor is an effective transport device and is relatively easily connectable to the production system and its control system. A further advantage is that the conveyor takes only little floor space and thereby provides more freedom for layout design below the overhead gantry robot.

According to an embodiment, the conveyor of the pickup station may be a roller conveyor or a slat conveyor, for example.

According to an embodiment, the pallets can alternatively be brought to the pickup station by means of transport platforms or automatically operating transport vehicles.

According to an embodiment, the loading station is a transport platform. In other words, the pallets are loaded on the transport platform by means of the overhead gantry robot. An advantage of the disclosed solution is that the transport platform can be transported from the loading station to a storage area or directly to a transport vehicle for railway or road transportation. A further advantage is that different type of transport platforms can be implemented which increases flexibility of the system.

According to an embodiment, the transport platform may comprise wheels whereby it can be towed by means of trucks, or the transport platform may be a lifting trailer.

According to an embodiment, the storage station is a transport platform. In other words, the protective sheets may be stacked on the transport platform, or the transport platform may be arranged to carry several pallets on which the protective sheets are stacked. An advantage of the disclosed solution is that the use of the transport platform increases logistical flexibility.

According to an embodiment, the protective sheets may be stacked on one or more pallets transported by means of forklifts or automated guided vehicles to the storage station.

According to an embodiment, the loading station may be provided with a lifting unit for moving the stacked pallets vertically so that the first, second and following layers can be stacked at the loading station on a same stacking level. In other words, the gantry crane can operate in one stacking level when stacking the pallets in multilayer configuration. An advantage of the disclosed solution is that handling speed of the gantry robot can be increased when needed vertical movements of the robot arm are shorter.

A further advantage is that operational height of the gantry robot can be dimensioned for only one layer stacking and this way building costs of the gantry robot can be minor compared to a gantry robot stacking the pallets into two or more layers.

According to an embodiment, the lifting unit may comprise a scissors table, for example.

According to an embodiment, the disclosed solution relates also to a method for handling pallets on which material is stacked. The method comprises: implementing an overhead linear gantry robot for transporting the pallets from a pickup station to a loading station; and mounting protective sheets on the pallets at the loading station. The method further comprises: using in the gantry robot a dual gripper whereby handling of the pallets is executed with forks of the gripper and handling of the protective sheets is executed with a vacuum gripper; loading the pallets at a loading station in at least two layers one on top of the other; and mounting protective sheets between the layers of the pallets.

The above disclosed embodiments may be combined to form suitable solutions having those of the above features that are needed.

BRIEF DESCRIPTION OF THE FIGURES

Some embodiments are described in more detail in the accompanying drawings, in which.

In the figures, like reference numerals identify like elements.

DETAILED DESCRIPTION OF SOME EMBODIMENTS

Figure 1:
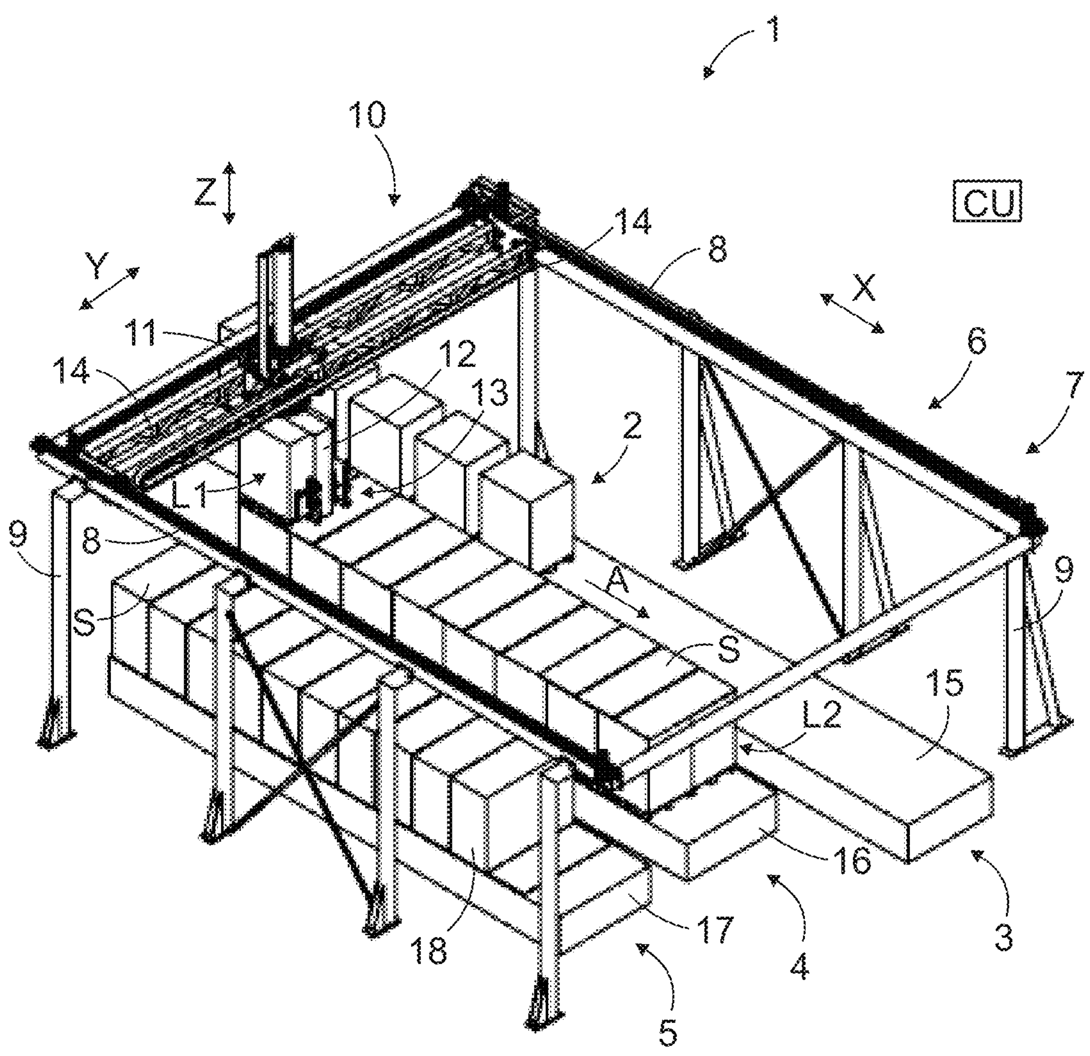
FIG. 1 is a schematic perspective view of an overhead loading and unloading system.

FIG. 1 discloses an overhead loading and unloading system 1 for handling pallets 2 on which material is stacked. The system 1 comprises a pickup station 3, a loading station 4, and a storage station 5 for storing protective sheets S. There is also an automatically controlled linear gantry robot 6. The pickup station 3, loading station 4, storage station 5 and the gantry robot 6 may form a work cell 7. Layout of the work cell 7 may be arranged so that the loading station 4 is located centrally, and the pickup station 3 and the storage station are located on opposite sides of the loading station 4. Then transport distances of the gantry robot 6 may be short. Operating area of the gantry robot 6 covers the entire work cell 7 and may thereby be relatively large. The gantry robot 6 comprises two overhead rails 8 mounted on fixed vertical supports 9. A transverse bridge 10 is supported movably to the rails 8 and is provided with a trolley 11 movable in longitudinal direction of the bridge 10. An overhead robot arm 12 is mounted to the trolley 11. The robot arm 12 is provided with a gripper 13. The bridge 10 is movable linearly along horizontal X-axis, the trolley 11 is movable linearly along horizontal Y-axis, and the robot arm is extendable and retractable linearly along vertical Z-axis. Then the robot arm 12 and its gripper 13 are movable linearly in three axis. Further, the robot arm 12 can be turned around the Z-axis so that the gripper 13 can be orientated to desired direction.

The bridge 10 of the gantry robot 6 has a lattice type structure and is provided with two lattice beams 14 comprising parallel longitudinal elements united by diagonal elements. In an alternative solution the bridge may be a conventional beam structure.

The pickup station 3 is a conveyor 15 on which the pallets 2 are transported from a production line to the work or robot cell 7. An arrow A indicates transport direction of the conveyor 15 The conveyor 15 may be a roller conveyor, for example. In Figures the conveyor 15 is shown in a highly simplified manner for clarity reasons. In an alternative solution there may be a movable platform or vehicle instead of the conveyor.

The loading station 4 is a transport platform 16, which may comprise wheels for towing by means of truck, or the transport platform may be a lifting trailer, for example. The storage station 5 indicates generally an area wherein the protective sheets S can be brought. For facilitating logistics, the storage station 5 may comprise a transport platform 17 on which the protective sheets S may be stacked to form piles 18 of protective sheets S. Alternatively, the transport platform 17 may be arranged to carry several pallets on which the protective sheets S are stacked. A further possibility is to transport separate pallets with the piles 18 of protective sheets S to the storage station 5 by means of fork trucks of automatically guided transport vehicles, for example.

Figures 5, 6, 7:
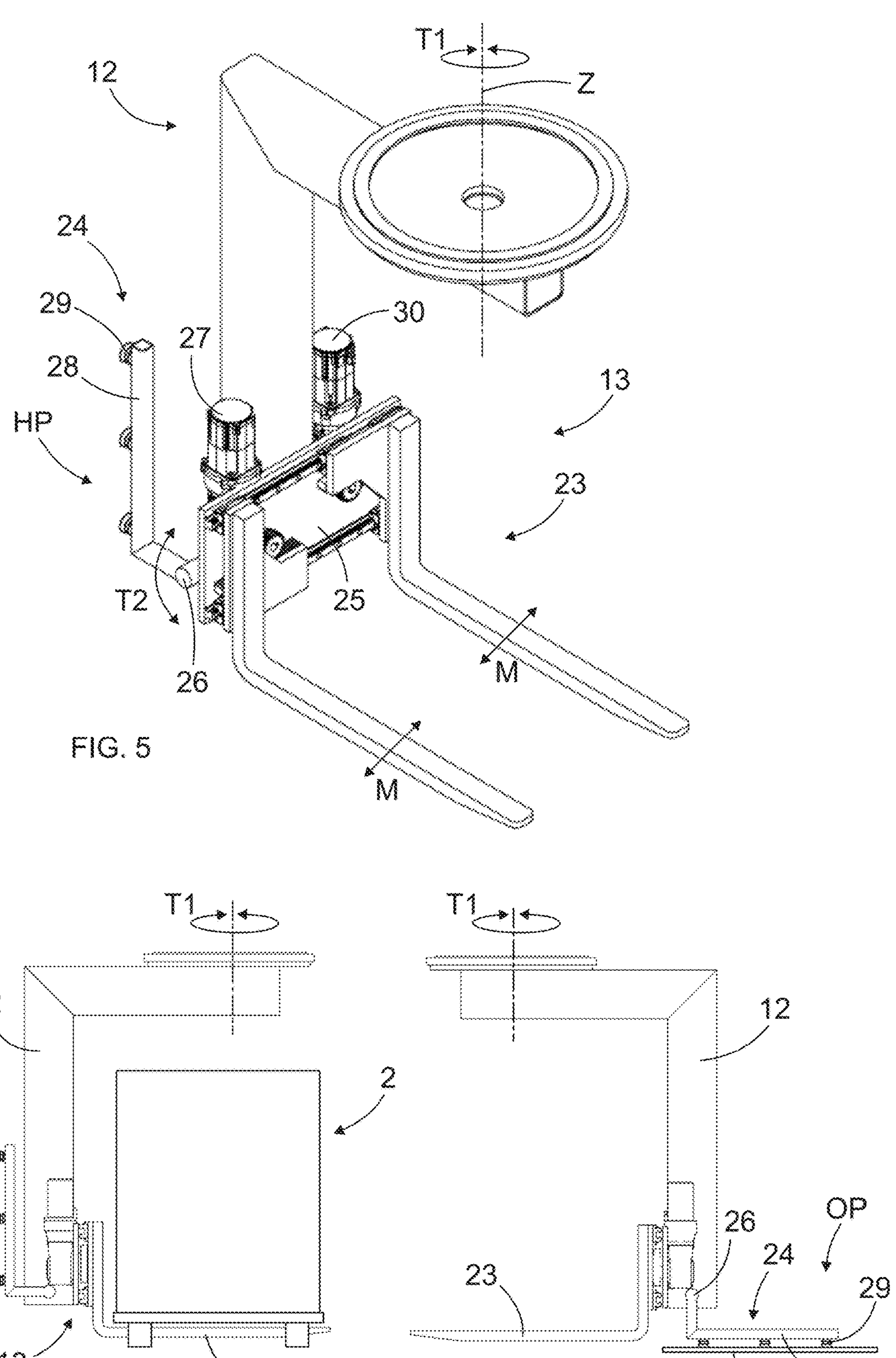
FIGS. 5-7 are schematic views of a robot arm provided with a dual-type gripper.

The gripper 13 is provided with forks for handling the pallets 2 and a vacuum gripper for handling the protective sheets S. The forks and the vacuum gripper are shown in FIGS. 5-7. The robot arm 12 transports the pallets 2 on the forks of the gripper 13 from the pickup station 3 to the loading station 4. The robot arm 12 can stack the pallets 2 two layers L1 and L2 one on top of the other. The robot arm 12 can pick up the protective sheets S from the storage station 5 by means of the vacuum gripper and places the protective sheets S on a first layer L1 of the pallets 2 before stacking a second layer L2 of the pallets 2 on the first layer L1. The stacking of the pallets 2 on the second layer L2 can be executed by using similar pattern of the pallets as in the first layer L1, or alternatively, the stacking pattern may be different in the second layer L2 for improving stability, for example. The turning feature of the robot arm 12 facilitates the handling of the pallets and allows also use of different patterns when placing the pallets 2 on the layers L1, L2. In some cases the number of the layers may be three or even more. It is also possible to implement different placing patterns and orientations for the protective sheets S.

A control unit CU is arranged to control operation of the system 1. The control unit CU may communicate with a process control system of a production plant and can control the gantry robot 6 based on received data.

Figure 2:
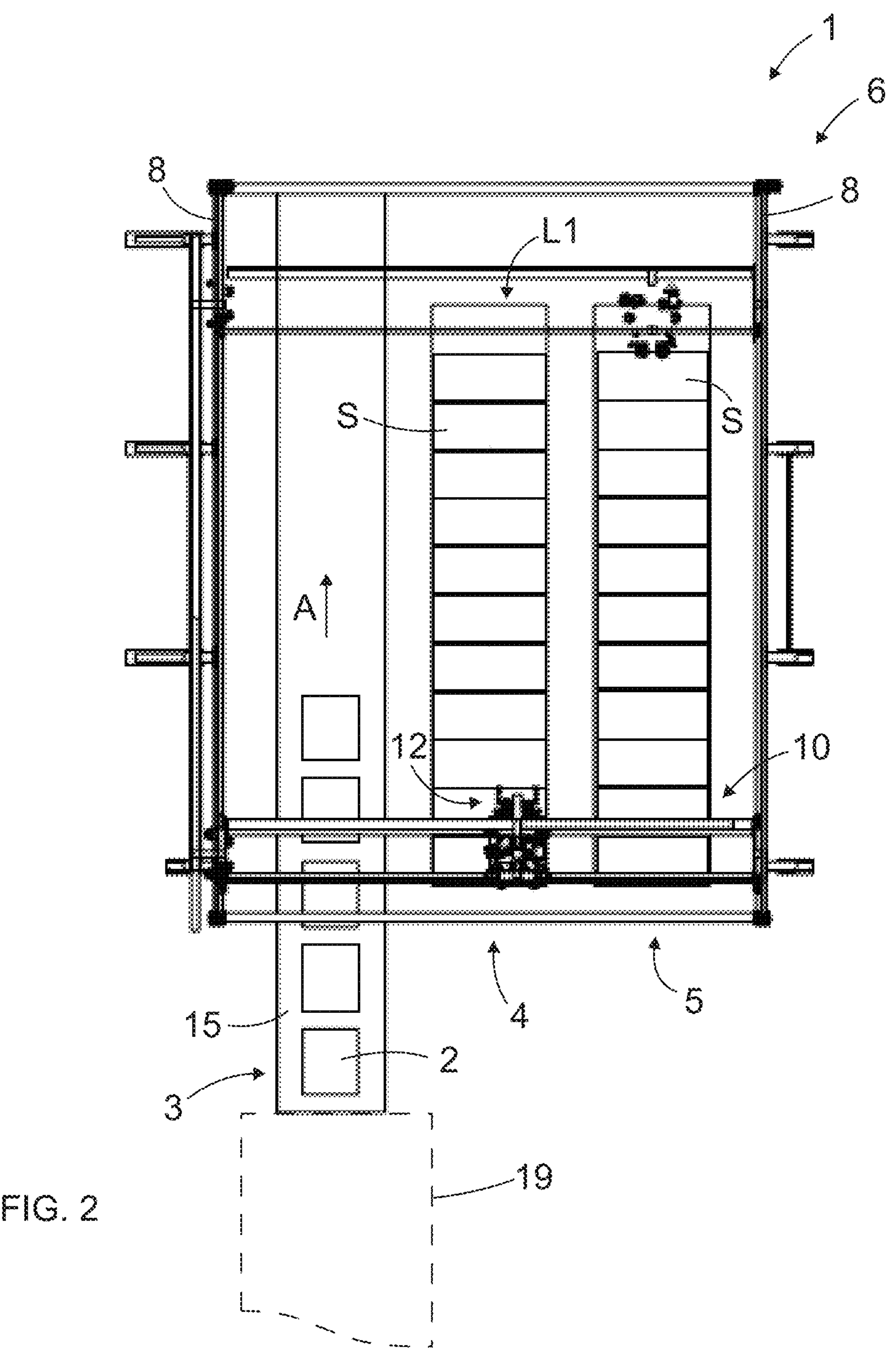
FIG. 2 is a schematic top view of an overhead loading and unloading system.

FIG. 2 discloses the system 1 shown in FIG. 1 from above. The robot arm 12 is placing a first pallet on the first layer L1 covered by the protective sheets S. The conveyor 15 transports the pallets 2 from a production plant 19, storage, transport system, or any other source.

Figures 3, 4:
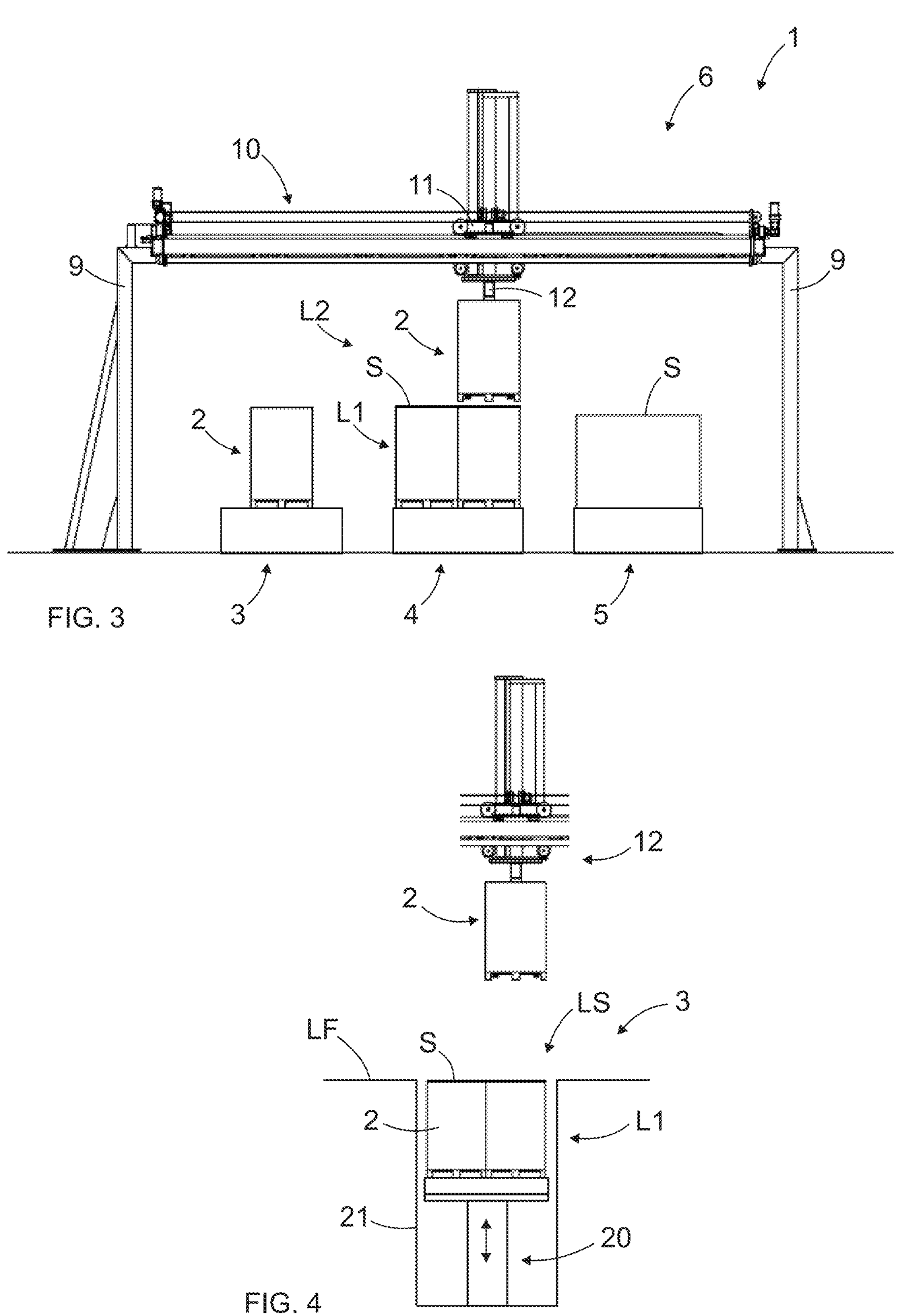
FIG. 3 is a schematic side view of an overhead loading and unloading system.
FIG. 4 is a schematic side view of a lifting unit of a loading station.

In FIG. 3 the system 1 shown in FIGS. 1 and 2 is placing a pallet 2 to form a second layer L2 on a first layer L1 of pallets 2. As can be seen there are protective sheets S between the layers L1 and L2.

FIG. 4 discloses in a simplified manner that the loading station 3 may be provided with a lifting unit 20 for moving the pallets 2 vertically so that the first, second and following layers can be stacked at the loading station 3 on a same stacking level LS. The stacking level LS may correspond to a floor level or may be selected to be any suitable level. The lifting unit 20 may comprise a lifting apparatus and needed mechanical support structures. The lifting unit 20 may be placed into a pit 21 provided on a floor. In this embodiment, the loading station 3 may comprise movable platform 22 on which the pallets 2 can be stacked by means of a robot arm 12.

FIGS. 5-7 disclose a gripper 13 which is of a dual-type comprising the forks 23 and a vacuum gripper 24 that are selectively operable by turning T1 the robot arm 12 around vertical Z-axis. Then the robot arm 12 can turn T1 the gripper 13 and select which of the two handling elements 23, 24 are used. The forks 23 and the vacuum gripper 24 are mounted to a body 25 of the gripper 13 and are facing into opposite directions relative to each other. The vacuum gripper 24 has two selectable positions. In FIGS. 5 and 6 the vacuum gripper 24 is in a vertical home position HP and in FIG. 7 in a horizontal operational position OP. The vacuum gripper 24 is turnable T2 between the operational position OP and the home position HP in relation to turning axis 26 by means of at least one actuator 27. The vacuum gripper 24 comprises a frame with at least two turnable frame parts 28 each provided with at least two suction elements 29.

Further, the forks 23 can be moved M laterally so that relative position of the forks 23 can be widened and narrowed. The gripper 13 may comprise one or more actuators 30 for adjusting the position of the forks 23.

The drawings and the related description are only intended to illustrate the idea of the invention. In its details, the invention may vary within the scope of the claims.

The invention claimed is:

1. An overhead loading and unloading system for handling pallets on which material is stacked, and the system comprises:

a pickup station;

a loading station;

an automatically controlled linear gantry robot;

an overhead robot arm of the gantry robot movable in three saxes (X, Y, Z);

a gripper mounted to the overhead robot arm;

a storage station for storing protective sheets (S);

wherein the gripper is provided with forks for handling the pallets and a vacuum gripper for handling the protective sheets (S);

and the robot arm is configured to transport the pallets on the forks of the gripper from the pickup station to the loading station, and is configured to stack the pallets in at least two layers (L) one on top of the other;

and the robot arm is configured to pick up the protective sheets (S) from the storage station by means of the vacuum gripper and is configured to place the protective sheets (S) on a first layer (L1) of the pallets prior stacking a second layer (L2) of the pallets on the first layer (L1).

2. The system as claimed in claim 1, wherein the gripper is of a dual-type comprising the forks and the vacuum grippers that are selectively operable by turning the robot arm around vertical Z-axis.

3. The system as claimed in claim 1, wherein the vacuum gripper is turnable (T2) between a horizontal operational position (OP) and a vertical home position (HP) in relation to turning axis by means of at least one actuator.

4. The system as claimed in claim 1, wherein the width of the forks of the gripper are automatically adjustable in accordance with the pallets and under control of a control unit (CU) of the system.

5. The system as claimed in claim 1, wherein the linear gantry robot comprises:

two overhead rails mounted on fixed vertical supports;

a transverse bridge supported movably to the rails;

a trolley supported to the bridge and being movable in longitudinal direction of the bridge;

and wherein the robot arm is mounted to the trolley.

6. The system as claimed in claim 5, wherein the transverse bridge of the gantry robot has a lattice type structure.

7. The system as claimed in claim 1, wherein the pickup station is a conveyor on which the pallets are transported from a production line to a cell comprising the disclosed overhead loading and unloading system.

8. The system as claimed in claim 1, wherein the loading station is a transport platform.

9. The system as claimed in claim 1, wherein the storage station is a transport platform.

10. The system as claimed in claim 1, wherein the loading station is provided with a lifting unit for moving the pallets vertically so that the first, second and following layers (L) can be stacked at the loading station on a same stacking level (LS).

11. A method for handling pallets on which material is stacked, the method comprises:

implementing an overhead linear gantry robot for transporting the pallets from a pickup station to a loading station;

and mounting protective sheets (S) on the pallets at the loading station;

wherein using in the gantry robot a dual gripper whereby handling of the pallets is executed with forks of the gripper and handling of the protective sheets (S) is executed with a vacuum gripper;

loading the pallets at a loading station in at least two layers (L) one on top of the other;

and mounting protective sheets (S) between the layers (L) of the pallets.

* * * * *